United States Patent [19]

Freudenberg

[11] Patent Number: 4,624,435
[45] Date of Patent: Nov. 25, 1986

[54] ELECTRO-MAGNETIC VIBRATION-DAMPING MOUNT

[76] Inventor: Tillmann Freudenberg, Finkenweg 3, 6108 Weiterstadt, Fed. Rep. of Germany

[21] Appl. No.: 602,299

[22] Filed: Apr. 20, 1984

[30] Foreign Application Priority Data

Apr. 20, 1983 [DE] Fed. Rep. of Germany ....... 3314335

[51] Int. Cl.⁴ ........................................... F16M 13/00
[52] U.S. Cl. .................................... 248/550; 180/300; 248/659
[58] Field of Search ............... 248/550, 559, 563, 638, 248/659, 636, 562, 563; 180/300; 188/267, 378, 379, 380; 267/140.1, 35, 113, 122

[56] References Cited

U.S. PATENT DOCUMENTS

| | | | |
|---|---|---|---|
| 3,059,915 | 10/1962 | Kemelhor | 188/267 X |
| 3,088,062 | 4/1963 | Hudimac | 188/267 X |
| 4,351,515 | 9/1982 | Yoshida | 188/267 X |
| 4,432,441 | 2/1984 | Kurokawa | 188/379 X |

FOREIGN PATENT DOCUMENTS

| | | | |
|---|---|---|---|
| 198122 | 12/1982 | Japan | 180/300 |
| 199220 | 11/1983 | Japan | 267/140.1 |
| 1828 | 1/1984 | Japan | 188/378 |
| 1829 | 1/1984 | Japan | 188/378 |
| 868182 | 9/1981 | U.S.S.R. | 188/378 |
| 970007 | 10/1982 | U.S.S.R. | 188/380 |

*Primary Examiner*—J. Franklin Foss
*Attorney, Agent, or Firm*—Felfe & Lynch

[57] ABSTRACT

A mount, for example for mounting an engine in a vehicle, has a resilient vibration isolator and, separate therefrom, an electro-magnetically controllable vibration-damping arrangement. In this way, the damping can be controlled independently of the isolation, for example in response to the amplitude of the vibrations only to isolate resiliently small-amplitude vibrations, but damp fully large-amplitude, road-bump vibrations which could damagingly shake the engine.

9 Claims, 13 Drawing Figures

ELECTRO-MAGNETIC VIBRATION-DAMPING MOUNT

BACKGROUND OF THE INVENTION

The invention relates to an electro-magnetic vibration-damping mount for, more particularly, the engine in a vehicle.

An engine mount is described in U.S. Pat. No. 2,387,066. It is capable of mounting an internal-combustion engine in a motor vehicle where its purpose would be to prevent the transmission of troublesome vibrations between the engine and the chassis of the vehicle.

The vibrations introduced into such a vechicle engine mount are, principally, of two different origins.

One, with vibrations is in the frequency range above about 30 Hz, is produced by the engine itself. These vibrations manifest themselves as a throbbing in the vehicle and should be kept away from the vehicle chassis as much as possible to prevent this. In other words, they should be isolated, for example resiliently, without any forces being transmitted through the mount.

The other, with vibration frequencies up to about 12 Hz, is produced in the vehicle, in traveling over a rough road, for example. Under worst-case conditions, such vibrations can shake the engine damagingly with amplitudes of up to about 10 cm. In a passenger automobile, for example, such excursions cannot be tolerated and must be prevented. This can be done only by damping, for example, by braking the engine excursion with the relatively-immovable chassis. This involves a dynamic stiffening of the mount between the engine and chassis, in other words, a dynamic induration (hardening) of the engine mount which becomes effective with corresponding amplitudes of vibration excursion between the chassis and the engine.

This is what is involved in the design according to the patent cited. It results, however, in impairing the isolating action of the mount and, hence, in transmitting the throbbing vibrations from the engine to the chassis.

Optimum coordination of isolating action and damping action has not been readily possible heretofore, however, because both depend on the dimensioning of the structural elements and the like for interdependence. Modifications require differently-sized structural elements and thus entail great expense.

SUMMARY OF THE INVENTION

The object of the invention is, therefore, to improve an engine-type mount in such a way that good throb-isolating action is assured while troublesome, large-amplitude shaking of the engine, for example, is largely eliminated.

In accordance with the invention, this object is accomplished in a mount which modifies its vibration transfer function electromagnetically, continuously if desired, by varying the damping forces exerted between a magnet and another, damping member movable relative thereto in the mount independently of a resilient, isolating function of the mount. The electromagnetic forces can then decelerate the mount movement as desired and, hence, for independent optimal damping and isolation of the vibrations causing the movement. These forces are, moreover, preferably different in magnitude and/or direction when the mount is lengthening, i.e. a mounting bracket and pedestal on opposite sides are moving away from each other, than when compressing, i.e. the above two parts are moving toward each other.

DESCRIPTION OF THE DRAWINGS

The invention, as well as preferred embodiments which are intended to illustrate but not to limit the invention, will now be described with reference to the drawings, in which.

ANALYSIS OF THE INVENTION

With respect to the vibratory behavior of a resiliently supported engine, the following correlations must be taken into consideration:

Let it be assumed that a four-cylinder P (only one shown) in-line engine E rotates with an angular velocity $\omega^* = \omega/2$. Such an engine exhibits a dynamic excitation with free second-order inertia forces, so that the engine system with mounts M on chassis C may be transformed ideally (real system (e.g. friction) forces and torque fluctuations being neglected) and unidimensionally (x) as shown in FIG. 1.

Figures 1, 2:
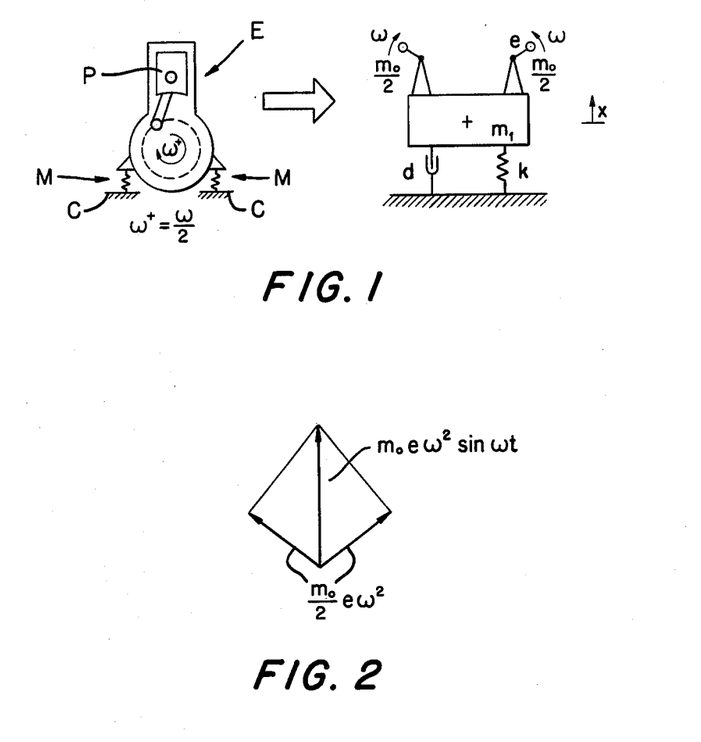
FIG. 1 illustrates schematically, on the left, a real engine system in which the invention may be used and, on the right, the transformation of the real system into a dynamically-equivalent, idealized, single-function component, unidimensional system.
FIG. 2 is a vector force diagram of the transformed system of FIG. 1.

The corresponding vector force diagram is shown in FIG. 2. The coordinate x is established from the static rest position of the system. The vector exciting forces are the centrifugal forces of the two rotating masses $m_o/2$ where the total mass of the transformed system m is:

$$m = m_o + m_1$$

$m_1$ being the non-exciting mass of the transformed system.

The force is given by the differential equation:

$$m\ddot{x} + d\dot{x} + kx = m_o e\omega^2 \sin\omega t$$

In this differential equation, the spring force is set according to Hooke's law ($F_k = kx$, where k is the spring constant) and the damping force as proportional by damping constant d to the first dirivative of x.

The solution of the differential force equation is on the right.

Figure 3:
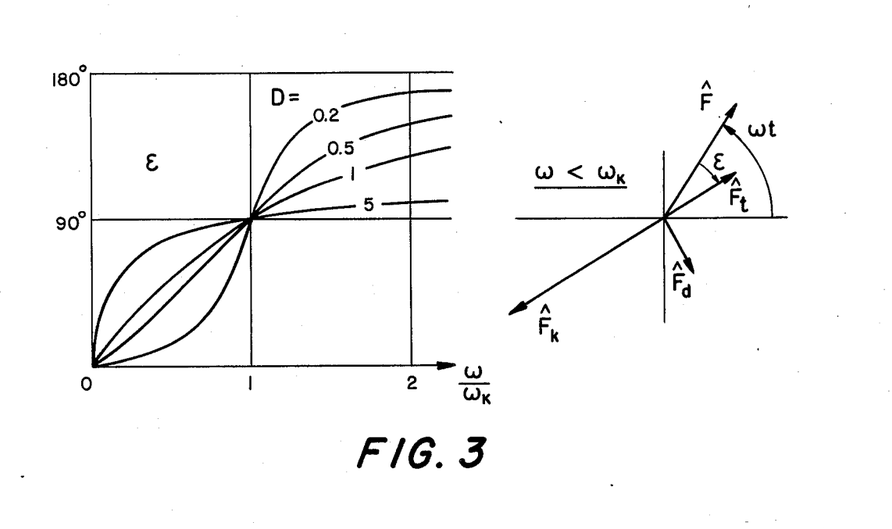
FIG. 3 shows the phase angle epislon of the excitation force vector $\hat{F}$ to the inertia force vector $\hat{F}_t$ at various ratios of frequencies $\omega$ in to the natural frequency of the system $\omega_k$ for various damping factors D.

The solution of the differential equation is the response of the system in the form of a displacement. This displacement lags behind the excitation by the angle $\epsilon$, as shown in FIG. 3, where:

$$\tan\epsilon = \frac{d\omega}{k - m\omega^2} = \frac{2D\omega/\omega_k}{1 - (\omega/\omega_k)^2}$$

$\hat{F}$ = Amplitude of excitation force
$\hat{F}_k$ = Amplitude of spring force
$\hat{F}_d$ = Amplitude of damping force
$\hat{F}_t$ = Amplitude of inertia force
Displacement $$x_{(t)} = e\frac{m_o}{m} \cdot \frac{1}{\sqrt{\left(1 - \left(\frac{\omega}{\omega_k}\right)^2\right)^2 + \left(2D \cdot \frac{\omega}{\omega_k}\right)^2}} \cdot \left(\frac{\omega}{\omega_k}\right)^2 \sin(\omega t - \epsilon)$$

$\underbrace{\phantom{xxxxxxxxxxxxxxxxxxxxxxxxxxxxxxxxxxxxxxxxxx}}_{\hat{x}}$ with the damping factor $$D = \frac{d}{2m\omega_k}$$

and the critical natural frequency $$(\text{for } D = 0) \quad \omega_k = \sqrt{\frac{k}{m}}.$$

Figure 4:
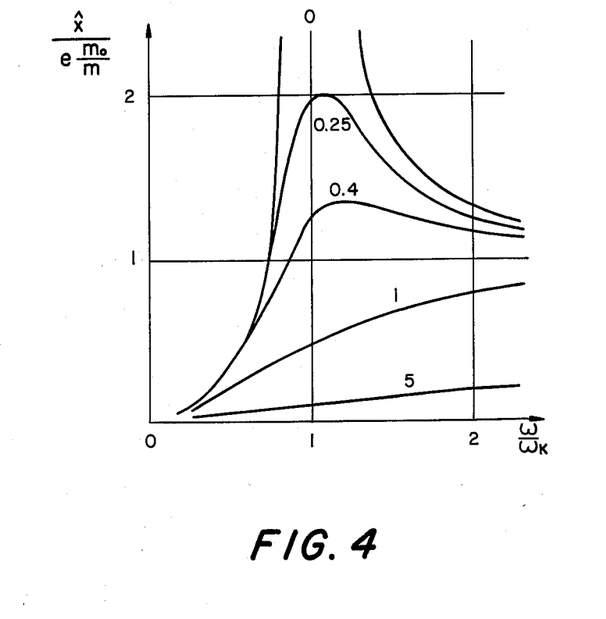
FIG. 4 is a nomograph of the normalized displacement x of the transformed system relative to the frequency ratios of FIG. 3 for various damping factors D.

Now when the frequency $\omega$ and the amplitude of the displacement $\hat{x}$ are made dimensionless in an appropriate manner, the diagram of FIG. 4 is obtained.

Since the dynamic excitation of the engine is to be isolated as effectively as possible from the supporting structure, the supporting force $F_L$ which is introduced into the structure at the base of the resilient pedestal is also of primary interest.

The supporting force $\hat{F}_L$ is composed vectorially of the spring force $\hat{F}_k$ and the damping force $\hat{F}_d$.

$$\hat{F}_L = \sqrt{\hat{F}_k^2 + \hat{F}_d^2} \;;\; \begin{matrix}\hat{F}_k = k\hat{x} \\ \hat{F}_d = d\hat{x}\end{matrix} \quad \dot{x}_{(t)} = \omega\hat{x} \cdot \cos(\omega t - \epsilon).$$

Figure 5:
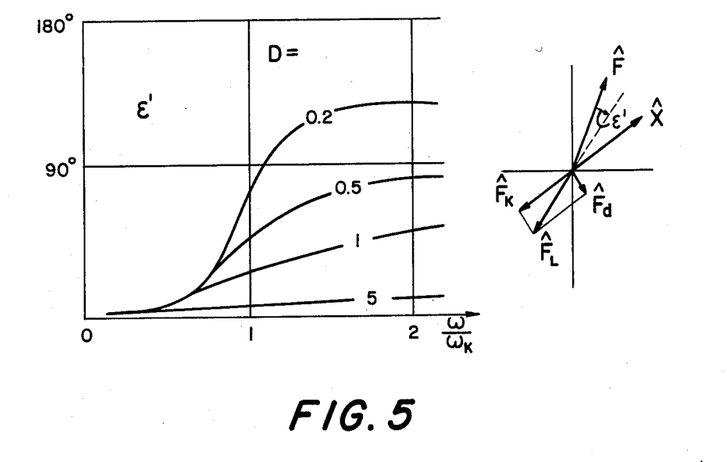
FIG. 5 shows the phase angle epsilon prime of the excitation force to the supporting force $\hat{F}_L$ similarly to FIG. 3.

$\hat{F}_L$ lags behind the excitation force $\hat{F}$ by the phase-shift angle $\epsilon'$ (FIG. 5).

$$\tan\epsilon' = \frac{2D(\omega/\omega_k)^3}{1 - (\omega/\omega_k)^2 + (2D\omega/\omega_k)^2}$$

Supporting force:

$$F_L = e\, m_o\omega^2 \underbrace{\frac{\sqrt{1 + (2D\omega/\omega_k)^2}}{\sqrt{(1 - (\omega/\omega_k)^2)^2 + (2D\omega/\omega_k)}}}_{\hat{F}} \sin(\omega t - \epsilon')$$

Figure 6:
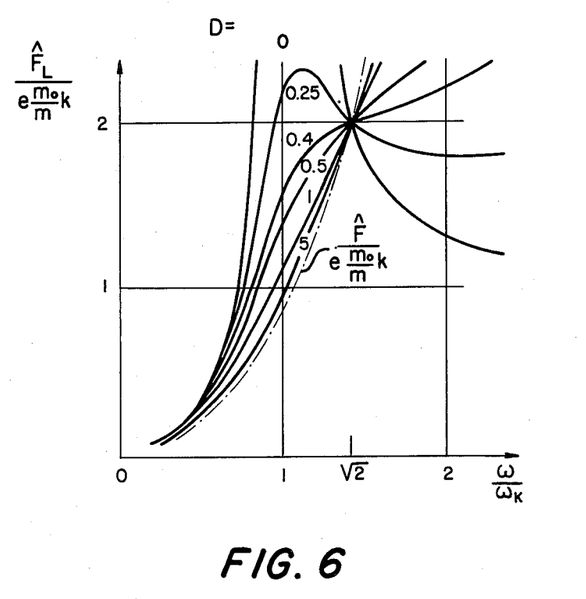
FIG. 6 is a nomograph of the normalized supporting force similar to FIG. 4.

Now when the frequency and the amplitude of the supporting force $\hat{F}_L$ are again made dimensionless in an appropriate manner, the graph shown in FIG. 6 is obtained.

The dash-dotted line represents the nondimensional excitation force $\hat{F}$. The solid curves represent the supporting force $\hat{F}_L$ for various damping factors.

FIGS. 4 and 6 illustrate the following correlations:

The amplitude of the supporting force $\hat{F}_L$ should be held as small as possible over the entire speed range of the engine while the mass excursion $\hat{x}$ is maintained within certain limits.

Turning now the the mass excursion $\hat{x}$, the equation underlying FIG. 4 is:

$$\hat{x} = e\frac{m_o}{m} \cdot \frac{1}{\sqrt{(1 - (\omega/\omega_k)^2)^2 + (2D \cdot \omega/k)^2}} \cdot (\omega/\omega_k)^2$$

With a given $e \cdot m_o$, $\hat{x}$ can be limited in three ways:

1. By increasing the mass m of the engine. This, however, runs counter to the trend toward lightweight construction in modern motor-vehicle manufacture.
2. By increasing the spring constants k and hence raising the critical natural frequency $\omega_k$. This, however, is undesirable since the natural frequency should be lower than the idling frequency of the engine.
3. By increasing the damping factor D. See FIG. 4.

Thus, $\hat{x}$ is best controlled through the damping factor D.

From the curves of the amplitude of the supporting force $\hat{F}_L$ in FIG. 6, it is apparent that pronounced damping is useful in the range of low frequencies $\omega < \sqrt{2}\omega_k$. On the other hand, in the range of higher frequencies $\omega > \sqrt{2}\omega_k$, little damping, if any, is decidedly more advantageous.

To summarize: The ideal engine mount can be derived from the foregoing considerations. It should be a resilient damping system in which the resilient element has minimum damping and the damper can be controlled to be zero (D=0) above an operating frequency of $\omega = \sqrt{2}\omega_k$.

Since, in the above analysis, only free forces arising from the dynamics were considered and the engine was treated as a one-dimensional system, FIG. 6, in reality, is distorted by friction, e.g. gas forces, and torque fluctuations as well as three-dimensional considerations.

To provide for a smooth transition at the frequency where the damping is to be reduced to prevent further transients, the damping should be reduced over a time constant T. This can be accomplished advantageously through an electronic control system.

To control the damping of the vibrations from the engine excitation force $\hat{F}$, the operating frequency $\omega^*$ of the engine on the mount must be known. This frequency can be determined by a sensor, such as an accelerometer, displacement transducer, etc., or derived from control signals for the ignition or fuel injection of the engine which, in modern engines, are controlled by thus already-available electronic rotative-speed and load signals.

Figure 7:
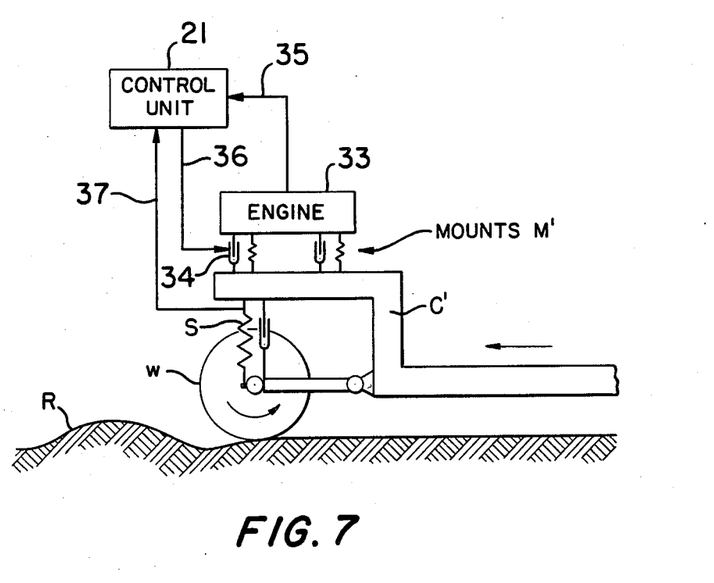
FIG. 7 is a schematic of a portion of a motor vehicle with an embodiment the invention shown in a transformation similar to that of FIG. 1.

In the case of externally-excited systems, for example, a moving motor vehicle as shown schematically in FIG. 7, the control system must also receive as an input, in addition to an operating frequency signal over line 35 from an engine 33, a signal for damping the engine mount which reflects the externally induced vibrations (supporting force $\hat{F}_L$) acting on the system. Such vibrations may be caused by a rough road, for example. A corresponding signal may be derived from the main springs of the moving vehicle over transducer line 37, or from the vertical acceleration of the system or the amplitudes of the engine mount itself, again with a sensor (e.g. switch 27, FIG. 13).

In greater detail, the engine 33 for propelling a motor vehicle is shown schematically as mounted fore and aft on a chassis C' of the vehicle with a pair of mounts at M', each mount being shown schematically as a dashpot damping member and spring resilient member in parallel. The chassis is supported by a spring S and shock absorber (damper) arrangement on wheel W which carries the vehicle down road R.

The signal proportional to the engine operating frequency over line 35 and the signal proportional to the chassis supporting force (flexure of spring S) over transducer line 37 are processed in a control unit 21 to obtain a composite control signal transmitted over line 36 to an electro-magnetic damping portion 34 of each engine mount at M' (only one being shown connected). The damping of each damping element 34 in each engine mount at M' is thus controlled relative to the inertial and supporting forces of the vibrations from the engine and road. Proper design of the control 21 according to the criteria described above therefore allows the engine mounts at M' to respond appropriately to the conditions about the vehicle.

The proposed engine mount thus not only provides for highly-effective isolation of engine-throbbing vibrations, but also reliably suppresses shaking of the engine. Isolating action and damping can be coordinated for critical operating conditions without any modification of structural elements and adjusted to optimum values, for example, for complete suppression of the damping action over one frequency range and of the isolating action over another frequency range.

There is no inherent interaction whatever between the resilient element and the damping system of the proposed engine mount, and this holds for the entire frequency range of the vibrations which are introduced. As a result, both the resilient element and the damping system can be designed optimally for their respective actual function, which could not be done with a hydraulic engine mount of the type mentioned earlier. A substantial weight reduction is also achieved. The mount, though very sturdy, is fairly easy to manufacture, and the isolating and its damping action reliably constant over a long period of time.

DETAILED DESCRIPTION OF PREFERRED EMBODIMENTS

Figure 8:
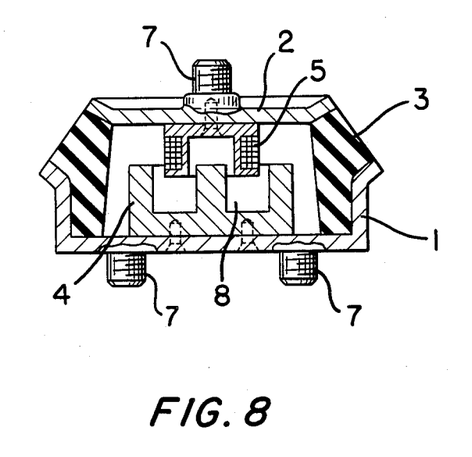
FIG. 8 is an elevation, partly in section, of the vibrationally-responsive portion of a first preferred embodiment of the invention without the associated control.

The embodiment shown in FIG. 8 is an engine mount having a cup-shaped, rotationally-symmetric mounting bracket 1 and an opposite, generally-flat pedestal 2, both of sheet steel. Two welded-on threaded studs 7 project from the bracket 1 for securing the mount to the chassis of a motor vehicle and one stud 7 projects oppositely from the pedestal 2 for securing the mount to an engine to be mounted thereon. The mounting bracket and the pedestal are interconnected by an annular resilient element 3 made of a rubber having soft, elastic properties for the spring function of the mount in isolating vibrations of the bracket or pedestal from the other.

The mounting bracket, pedestal and connecting, annular resilient element thus jointly enclose a hollow space which accommodates the damping system of the mount. The damping system includes a magnet 4 attached to the mounting bracket and an annular damping member 5 attached to the pedestal.

The magnet 4 is a cylindrical permanent magnet with an annular recess 8 in its face opposite the bracket 1 on the axis of rotational symmetry of the mount and open toward the pedestal for receiving the damping member 5 when forces from the engine or chassis or both compress the resilient element 3 between the bracket and pedestal.

The annular damping member 5 has an induction coil arranged for operative electro-magnetic association with the permanent magnet when the pedestal and bracket move relatively toward and away from each other. The terminal ends of the coil (not shown) are connected by a variable resistor (not shown). The currents of opposite directions produced as the induction coil is lowered into or withdrawn from the recess in the permanent magnet by vibrator compression of the resilient element 3 are dissipated in the resistor and produce the desired damping. (As used herein, compression includes stretching as negative compression.) The associated control system (21) for controlling the resistance of the variable resistor also is not shown.

Figure 9:
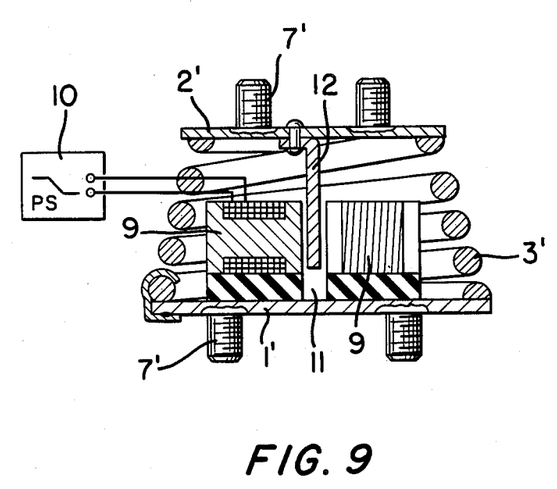
FIG. 9 is an elevation, partly in section, of the vibrationally-responsive portion of a second preferred embodiment of the invention with a portion of its associated control.

In the different embodiment shown in FIG. 9, the mounting bracket 1' and the pedestal 2' each consist of a flat steel plate, but threaded studs 7' are welded on to project therefrom, as before. The steel plates are interconnected by a resilient element 3' formed, in this embodiment, however, by a soft coil spring designed to meet the requirements for a spring vibration isolator.

The damping system is again accommodated in the space enclosed by the mounting bracket, pedestal and resilient element. It includes, in this embodiment, however, an electromagnet 9 which is supplied with stabilized direct current from a variable power supply 10 and, thus, has variable field strength.

The electromagnet 9 has a gap 11 which extends in a direction parallel to the axis of rotational symmetry of the mount and the direction between the bracket 1' and plate 2', and, thus, the direction of the vibratory motion to be variably damped in the mount. The magnetic field lines of the electromagnet cross the gap 11, preferably directly, i.e. horizontally, between segmented pole pieces of the magnet as shown in FIG. 9 as opposed to the top-end loop known for the magnet shown in FIG. 8.

An eddy current member 12 variably projects into the gap 11 from the pedestal plate 2' in dependence upon the vibrational compression (stretching) of the spring 3'. Eddy currents of different magnitude and directions are thus induced in the eddy current member as a function of the direction and relative velocity of the vibrational motion introduced between the bracket 1' and pedestal 2' which modify and phase shift the interacting forces. The desired independent damping and isolating action with damping control is, therefore, obtained also in this case, the vibration frequency-responsive control of the damping being provided by so controlling the power supply 10, the control for the power supply again not being shown.

Figure 10:
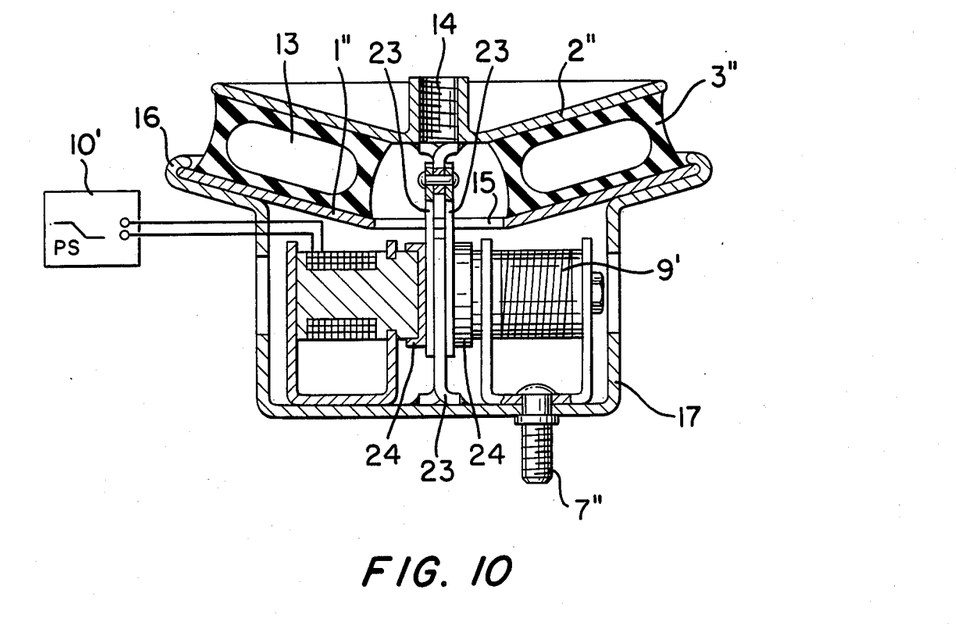
FIG. 10 is an elevation, partly in section, of the vibrationally-responsive portion of a third preferred embodiment of the invention with a portion of its associated control.

In the embodiment shown in FIG. 10, the mounting bracket 1" and pedestal 2" are formed by nested, conical plates interconnected by an annular, rubber resilient element 3". The latter has an annular, gas-filled hollow space 13 to provide particularly soft resilience characteristics with low self-damping.

The pedestal 2"0 has a threaded socket 14 instead of a pin for connection to the engine, but the bracket 1" continues to have a pin 7" associated therewith for connection to the chassis. The bracket 1" also has an opening 15 across the axis of rotational symmetry of the mount. The bracket 1" is secured by a flange 16 to a cup-shaped housing 17 which projects away from the pedestal 2" and accommodates the damping system and pin 7".

Friction plates 23 form the damping system in this embodiment. One set of the friction plates 23 depends from the pedestal 2" through the opening 15 in the bracket 1" and another projects therebetween from the housing 17. Guide surfaces 24 adjacent the friction plates 23 only make sure the friction plates loosely abut on each other, but the friction plates also can be pressed together for friction damping by an electromagnet 9' that is secured to the housing. A controllable power supply 10' is provided for adjusting the electromagnetically-produced, friction damping action, the control therefor being, again, not shown.

The drawback of conventional friction dampers resulting from overcoming the friction at small amplitudes is thus avoided. In this embodiment, friction adjustment can be made by the control of the power supply 10' with a controllable amplifier circuit or a circuit with at least one relay, neither shown. These can be advantageously controlled by sensors which detect the frequency and/or amplitude and/or direction of rotation of the engine mounted on the pedestal 2", as well as external disturbances from the road, for example. Utilization of the control signals for ignition and/or fuel injection in the engine is also possible, all as previously described with reference to FIG. 7.

Figure 11:
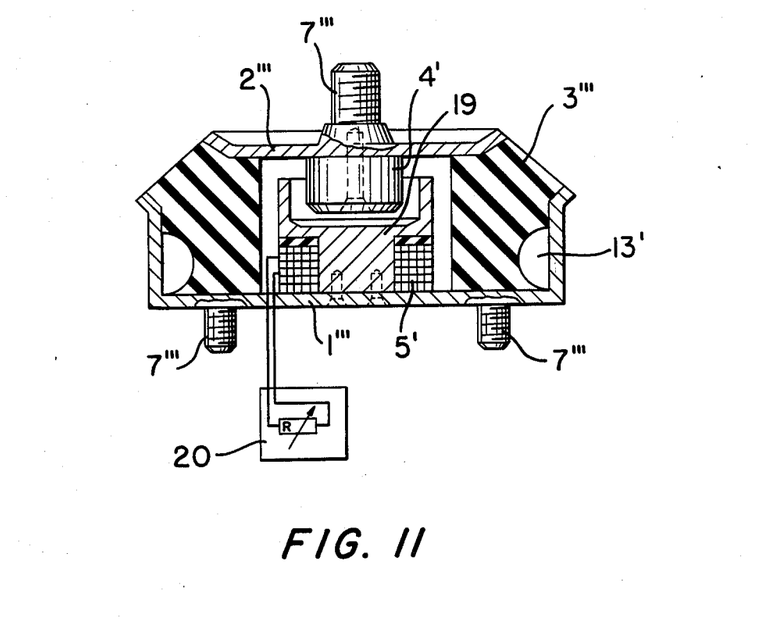
FIG. 11 is an elevation, partly in section, of the vibrationally-responsive portion of a fourth preferred embodiment of the invention with a portion of its associated control.

The embodiment shown in FIG. 11 is similar to that of FIG. 8. The mounting bracket 1''' is, again, a cup-shaped housing of sheet steel with a rim which is outwardly expanded in the manner of a cone and provided with two welded-on threaded studs 7''' extending in a direction parallel to the direction of the motion to be dealt with.

The pedestal 2''' is, again, a flat plate with another welded-on threaded stud 7''' and a rim expanded substantially parallel to a conical enlargement of the mounting bracket for receiving therebetween an annular resilient member 3'''. The resilient element thus interconnects the mounting bracket and pedestal, as before. The resilient element 3''', however, together with a portion of the wall of the mounting bracket that extends in the direction of the motion to be dealt with, bounds a gas-filled, peripheral hollow space 13' for soft resilience as with the embodiment shown in FIG. 10.

The mounting bracket, pedestal and resilient element again enclose a central hollow space for accommodating the damping system which, again, has rotational symmetry. The damping system, as in the embodiment of FIG. 8, again comprises an annular permanent magnet 4', but in this embodiment, it is attached to the pedestal 2''' and adapted to be lowered into a recess in the exposed (upward) face of a magnetic core 19 of an induction coil 5' which is fastened to the mounting bracket 1'''. The induction coil 5' is connected to a variable resistor 20 to permit modification of the damping action obtained from relative movement of the magnet. The variable resistor 20 is controlled by a control and sensor(s) (not shown) for the frequency and/or amplitude and/or direction of engine vibrations and externally-caused (road) vibrations to which the vehicle chassis (not shown) secured to the bracket 1''' is subjected.

Figure 12:
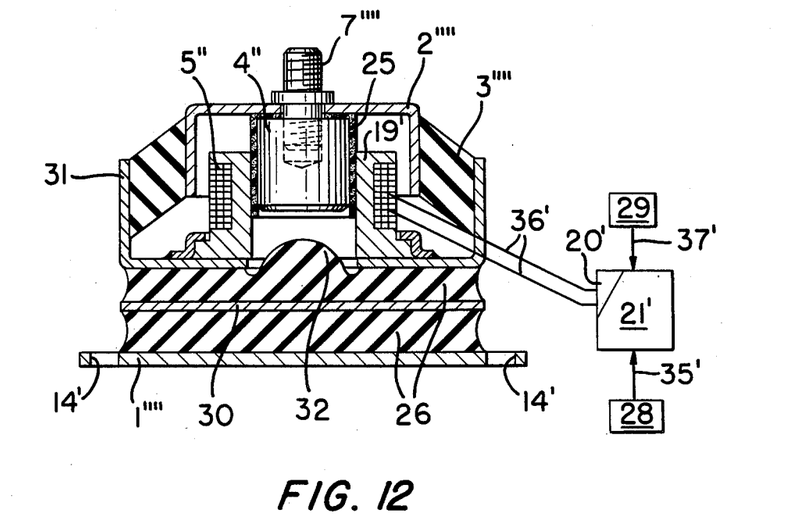
FIG. 12 is an elevation, partly in section, of the vibrationally-responsive portion of a fifth preferred embodiment of the invention with its associated control.

The embodiment shown in FIG. 12 has a pedestal 2'''' formed by an inverted-cup-shaped plate of sheet steel. A conical resilient element 3'''' connects edges of the cup-shaped pedestal 2'''' to an oppositely-oriented, cup-shaped intermediate support 31. The latter is mounted on a flat plate mounting bracket 1'''' with a further resilient thrust pad 26 made of rubber and interrupted by an anti-tilt plate 30.

The damping system is disposed in a hollow space enclosed by the intermediate support, resilient element and pedestal. It again has a cylindrical permanent magnet 4'' which extends in a direction parallel to the direction of motion to be dealt with (vertically). The cylindrical sides of the magnet are wrapped in a sleeve 25. The latter is formed of polytetrafluoroethylene in which iron particles are uniformly dispersed for improved magnetic permeability.

The sleeve 25 slidingly abuts in the axial direction an inner, guide-surface wall of a magnetic core 19'. The latter is made of iron and is surrounded by an induction coil 5''.

The induction coil 5'' is connected to an electrical control element (e.g., variable resistor) in a control unit 21'. The control unit is connected to an engine-shake sensor 29, for example on a vehicle suspension spring S as in FIG. 7, by lead 37' and to an engine-frequency sensor 28, for example, again as in FIG. 7, by lead 35'.

The guide surface and sleeve 25 assure that the magnet, and thus the pedestal, is able to move in the magnetic core in a direction parallel to that of the vibrations to be dealt with while further resisting tilting. Transverse motions between the mounted engine and chassis are thus doubly resisted. For extreme downward deflections, a limit stop 32 is provided to engage magnet 4''. The latter is formed by a dome of the material of the resilient thrust pad 26, with which it is integral, for progressively-greater resilient resistance to still more extreme deflection.

Figure 13:
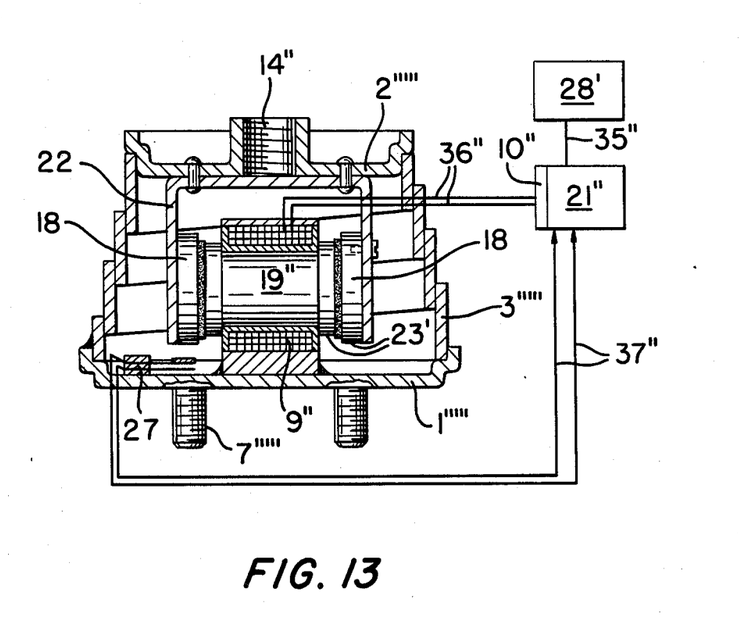
FIG. 13 is an elevation, partly in section, of the vibrationally-responsive portion of a sixth preferred embodiment of the invention with its associated control.

In the embodiment shown in FIG. 13, the mounting bracket 1''''' and the pedestal 2''''' are substantially flat and interconnected by a conical leaf spring 3'''''. The individual turns of the conical leaf spring slidably abut one another along guide surface portions thereof for lateral stability and extend in a direction parallel to that of the vibrations to be dealt with for resiliently isolating these.

The mounting bracket 1''''' carries the coil of an electromagnet 9'' on a cylindrical magnetic core 19''. The latter is provided on both ends with a friction contact surface 23' extending in a direction parallel to that of the vibrations.

Attached to the pedestal 2''''' is a clevis spring 22 which carries the other, cooperative friction contact surface 23'. The clevis actually carries directly two permanent magnets 18 and these are provided with the friction lining 23' on the clevis mentioned before.

In the embodiment of FIG. 13, extremely high damping forces are obtained just before maximum compressive (downward) deflection via a contact switch 27. It controls unit 21 to deliver extremely large currents of selected polarity to the coil of magnet 9'' upon such deflection.

OPERATION

The effectiveness of the invention is based, in addition to its adjustability, on the utilization electro-magnetic forces directly or as magnetically-generated friction forces for permitting the movement of a vibrating engine to be damped as desired. The operation of FIG. 13 illustrates both, and thus will be described in further detail.

Higher-frequency, lower-amplitude vibrations, usually from the engine connected at 14''; in the (vertical) direction between the bracket 1''''' and pedestal 2''''' are resiliently isolated from the chassis connected at 7''''' (and vice versa) by the leaf coil spring 3'''''. The overlap of the leaves of the spring also provides lateral stability and some lateral vibration isolation.

At the lowest amplitude, maximum isolation and minimum damping is desired to keep the engine vibrations from throbbing the vehicle chassis. For this, engine speed detector 28 provides a signal over line 35'' to control 21'' which sets variable power supply 10'' to produce a current over line 36'' to electromagnet 9'' which gives the magnetic core 19'' the same magnetic polarity as the adjacent ones of permanent magnets 18 for repelling them against the action of clevis spring 22. As a result, the friction linings 23' are magnetically separated to provide no damping, as desired.

At higher amplitudes, some damping is desired to limit an amplitude of the vibrations. For this, the engine speed detector provides a signal over line 35'' to control 21'' which sets variable power supply 10'' to produce a lesser current over line 36'' to electromagnetic 9'' insufficient to separate magnetically the friction linings 23'. For example, speed detector 28' can shut off electromatnet 9''. The clevis spring 22 then urges the friction linings 23' together, and the friction therebetween provides some damping, as desired.

At still higher amplitudes of vibration especially the fewer-cylinder engines popular today, reach, further damping may be desired. For this, speed detector 28' can cause, as before, power supply 10'' to reverse the current originally described and thus the poles of magnetic core 19'' to the opposite of those of permanent magnets 18. The magnets then attract to aid the clevis spring in holding friction linings 23' together for greater damping, as desired.

At the highest amplitudes (and usually lowest frequencies), for example when the vehicle hits a bump in the road, the large amplitude excursion, which could damagingly shake the engine as described, should be maximally damped, i.e. the engine should be rigidly held to the more-massive and thus less-movable chassis. For this, the maximum compression of the spring 3''''' which initially results causes clevis spring 22 to throw switch 27. This causes a signal over transducer line 37'' to control 21'' which causes power supply 10'' to produce maximum current of a polarity producing opposite polarities in the magnetic core 19'' and permanent magnets 18. The maximum current is sufficient for the then opposite magnetic poles to attract sufficiently to lock the friction linings 23'' immovably together and thus rigidly connect the engine to the chassis, as desired.

It is thus apparent, too, that one embodiment of the control 21 is a mere pole-reversing switch relative to the power supply 10'' and resulting poles of magnetic core 19''. Specifically, detector 28' can set it to separate the friction linings magnetically and switch 27 can set it to lock the friction linings together magnetically, although a third, off condition is desirable and easily provided for some, clevis-spring-produced frictional interaction between the friction linings.

It will be understood from the above description of the operation of the embodiment of FIG. 13, further, how the mount could be made directionally responsive. In movement toward switch 27, the highest damping produced thereby has not yet been activated. Once switch 27 has been thrown, however, a time delay (not shown) in control 21'' for the vibration to move in the other, lengthening direction would hold the maximum damping over the period of the vibration lengthening of the mount. Other directionally-responsive controls are, of course, known and could be used to vary the damping in response to the compressing or lengthening directional phase of the vibration.

The other embodiment with friction linings in FIG. 10 will be understood to operate generally similarly, but without the advantage of magnetic separation from the permanent magnets 18 in FIG. 13. The embodiments of the other Figures, without friction linings, can, however, operate similarly using magnetic force in place of friction. In FIG. 12, for example, replacing variable resistor 20' with a variable power supply could holdingly attract, repel, and release permanent magnetic 4''.

As shown in FIGS. 8 to 12, however, these embodiments rely, instead, on the motionally-induced electromotive force of electro-magnetic interaction (the right hand rule). As this is well known from power generation, for example, further explanation of how the other embodiments work as a mount similarly to that described is not needed.

In the embodiments shown in FIGS. 8 to 11, however, no provision is made for the damping and isolation of vibrations introduced in a direction at right angles to the direction (vertical) of the motion to be dealt with. In addition to transversely movable support for at least one of the two damping members, it is therefore advisable to enhance the effect by the use of a plurality of engine mounts side by side. High efficiency is secured especially through the embodiments shown in FIGS. 12 and 13.

The proposed engine mount is of very lightweight construction. It is capable of effectively isolating high-frequency vibrations while limiting the amplitude of vibration of vibrating engine under critical operating conditions to tolerable values.

It will be appreciated that the instant specification and claims are set forth by way of illustration and not of limitation, and that various changes and modifications may be made without departing from the spirit and scope of the present invention. In particular, it should be understood that the mount is not limited to the vehicle engine use described merely to show the preferred utility and that, in relation thereto, the connection of bracket and pedestal to chassis and engine may be reversed.

What is claimed is:

1. An electro-magnetic vibration-damping mount, comprising:
    a bracket and pedestal for, in use, respective connection to and, thereby, vibration with relatively-vibrating structures;
    resilient means connecting the bracket and pedestal for resiliently isolating the vibrations therebetween in at least one direction;
    damping means for damping the vibrations between the bracket and pedestal in the one direction, the damping means comprising a magnet operatively connected to one of the bracket and pedestal and an induction coil operatively connected to the other for electro-magnetic interaction with the magnet in response to the vibrations between the bracket and pedestal in the one direction; and
    electro-magnetic control means for controlling the damping means comprising a variable resistor electrically connected across the induction coil.

2. The mount of claim 1, wherein the electro-magnetic control means further comprises means for varying the field strength of the magnet.

3. The mount of claim 1, wherein the electro-magnetic control means further comprises means responsive to at least one of the frequency and amplitude of the vibrations in the one direction for controlling the variable resistor.

4. The mount of claim 2, wherein the electro-magnetic control means further comprises means responsive to at least one of the frequency and amplitude of the vibrations in the one direction for controlling at least one of the variable resistor and means for varying the field strength of the magnet.

5. The mount of claim 3, wherein the control and damping means are responsive to the frequency of the vibrations such that the damping is increased above 2½ times the natural frequency of the system of the structures connected to the bracket and pedestal.

6. The mount of claim 1, wherein the electro-magnetic control means further comprises means responsive to the directional phase of the vibrations in the one direction for varying the controlling thereof.

7. The mount of claim 2, wherein the electro-magnetic control means further comprises means responsive to the directional phase of the vibrations in the one direction for varying the controlling thereof.

8. The mount of claim 3, wherein the electro-magnetic control means further comprises means responsive to the directional phase of the vibrations in the one direction for varying the controlling thereof.

9. The mount of claim 5, wherein the electro-magnetic control means further comprises means responsive to the directional phase of the vibrations in the one direction for varying the controlling thereof.

* * * * *